Jan. 6, 1931.  G. ST. J. PERROTT ET AL  1,787,875
PURIFICATION OF AIR TO RENDER THE SAME SUITABLE FOR BREATHING
Original Filed Jan. 10, 1919
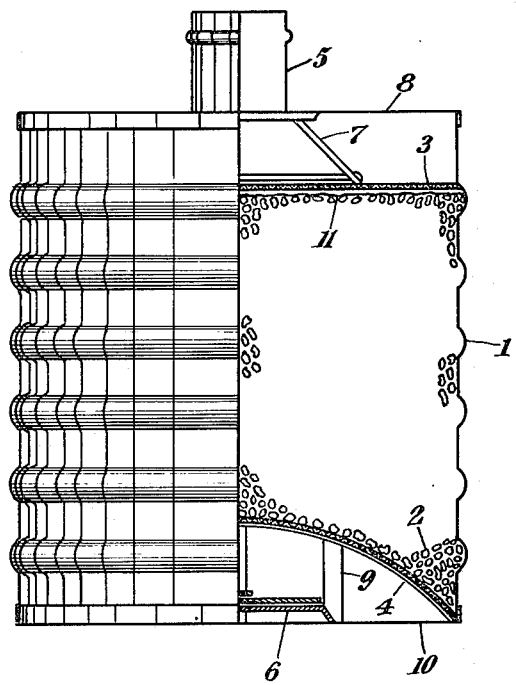
INVENTOR.
George St. J. Perrott
Max Yablick
BY
ATTORNEYS.

Patented Jan. 6, 1931

1,787,875

UNITED STATES PATENT OFFICE

GEORGE ST. J. PERROTT, OF PITTSBURGH, PENNSYLVANIA, AND MAX YABLICK, OF NEW YORK, N. Y., ASSIGNORS, BY DIRECT AND MESNE ASSIGNMENTS, TO MINE SAFETY APPLIANCES COMPANY, OF PITTSBURGH, PENNSYLVANIA, A CORPORATION OF PENNSYLVANIA

PURIFICATION OF AIR TO RENDER THE SAME SUITABLE FOR BREATHING

Original application filed January 10, 1919, Serial No. 270,606, now Patent No. 1,559,980. Divided and this application filed November 2, 1925. Serial No. 66,409.

This application is a division of our prior application Serial No. 270,606, filed January 10th, 1919, now patent 1,559,980, granted November 3, 1925. The invention to which that application has been restricted is based in part on our discovery that comparatively small quantities of certain compounds of certain metals which form ammonia addition or substitution products, will operate to effectively and completely remove all of the ammonia from air containing any high concentration of ammonia in which a workman can remain without serious burning of the skin. Thus the air is rendered suitable for breathing immediately after passing in contact with the adsorbent. Among such compounds are the solid hydrates of certain heavy metals, the preferred material mentioned being copper sulfate.

Copper sulfate, although a very satisfactory adsorbent for ammonia, has very little or no effect as a protection against most other gases. Therefore in a fire, for instance in a refrigerating plant, a mask having a charge of copper sulfate, will fully protect the wearer against ammonia fumes which may be escaping, but it will not protect him against various other gases or fumes which may be produced by reason of the fire.

The main object of our present invention is to provide an adsorbent having many of the properties of copper sulfate, and which will at the same time operate to satisfactorily remove other gases in addition to the ammonia or in the absence of ammonia. Thus the protection is more nearly universal.

We have discovered that solid, absorbent silicic acid, i. e. silica gel, is a very satisfactory material for this purpose, and that it combines many of the useful properties of charcoal with that of an ammonia absorbent. Charcoal will absorb large quantities of ammonia but is not satisfactory for use in a gas mask to remove ammonia from air to be breathed because it does not remove all of the ammonia and slowly gives up that which it has absorbed. The combination of the properties of both charcoal and copper sulfate is thus secured in one material. The solid dry absorbent silicic acid, i. e. silica gel, may be made in any well known manner, as for instance as described by Anderson in Zeitschrift für Physik Chemie, Vol. 88, page 195, 1914, or in German Patents 279,075, 290,530, or 291,163. This material made by any of these methods is of good mechanical strength so that there is no danger of crushing, packing or dusting; it closely approximates the density or porosity giving the maximum gas absorbing properties; it has high intrinsic activity; there is no heat of reaction under ordinary conditions of use which would prevent the air from being breathed immediately after treatment; no caustic or other fumes are evolved during the absorbing action; the resistance to the passage of the air is low, and does not increase during the operation; the weight of the absorbent is low in respect to the weight of the ammonia and other gases which it is capable of absorbing; the efficiency is high for a considerable period of time; the absorbed ammonia and other gases are effectively held or retained under the conditions under which they are absorbed; the ammonia and other gases absorbed are readily removed by moderate temperature elevation, especially when aided by steam distillation or vacuum, and without change in the structure of the absorbent, whereby the absorbent may be repeatedly reused; and the material does not undergo change while stored for use.

The silica gel is of a highly porous nature, and contains minute capillaries throughout its structure, in which the gas is adsorbed or condensed. Ordinarily these capillaries contain some moisture, and if the gel be precipitated from an acid solution they may also contain small amounts of acid. The capillaries themselves have very great gas absorbing action, but the presence of moisture and the presence of acid aid materially in the ammonia removing or fixing action.

The silica gel is preferably broken up into a granular mass before being packed in the container, so that there will be adequate exposed surface for action on the gas.

Our improved absorbent when in use is preferably packed in a metal container, preferably of a type adapted for attachment to a gas mask.

The accompanying drawing illustrates an apparatus in which our absorbent material may be employed, but the details of the construction there shown form no portion of our invention. The canister 1 has absorbent material 2 packed between screens 3 and 4. The neck 5 of the canister is adapted to be attached to the hose of a gas mask and air which is to be purified may enter at the base of the canister through the valve 6. Air upon being sucked past the valve 6 and through the absorbent material 2, passes out through the neck 5 to the gas mask. During the passage of the air through the absorbent material, any ammonia or other gas which it may carry will be removed therefrom by the absorbent material 2.

In order to maintain the absorbent material in compact form and in proper position, this type of canister is provided with a spring 7 which presses against the screen 3 and the top 8 of the canister. The material rests on a dome-shaped screen 4 having supports 9 between it and the base 10 of the canister. A layer of fabric 11 may also be provided to remove particles of dust from the air before it passes into the neck 5.

Having thus described our invention, what we claim as new and desire to secure by Letters Patent is:—

The process of purifying air vitiated with a high concentration of ammonia, to render the air suitable for breathing after purification and without intermediate cooling or other treatment, which consists in passing the air through a dry, solid mass of absorbent silicic acid.

GEORGE ST. J. PERROTT.
MAX YABLICK.